Aug. 29, 1950  W. C. HANSON  2,520,718
MATERIAL SPREADING APPARATUS
Filed July 12, 1946  2 Sheets—Sheet 1
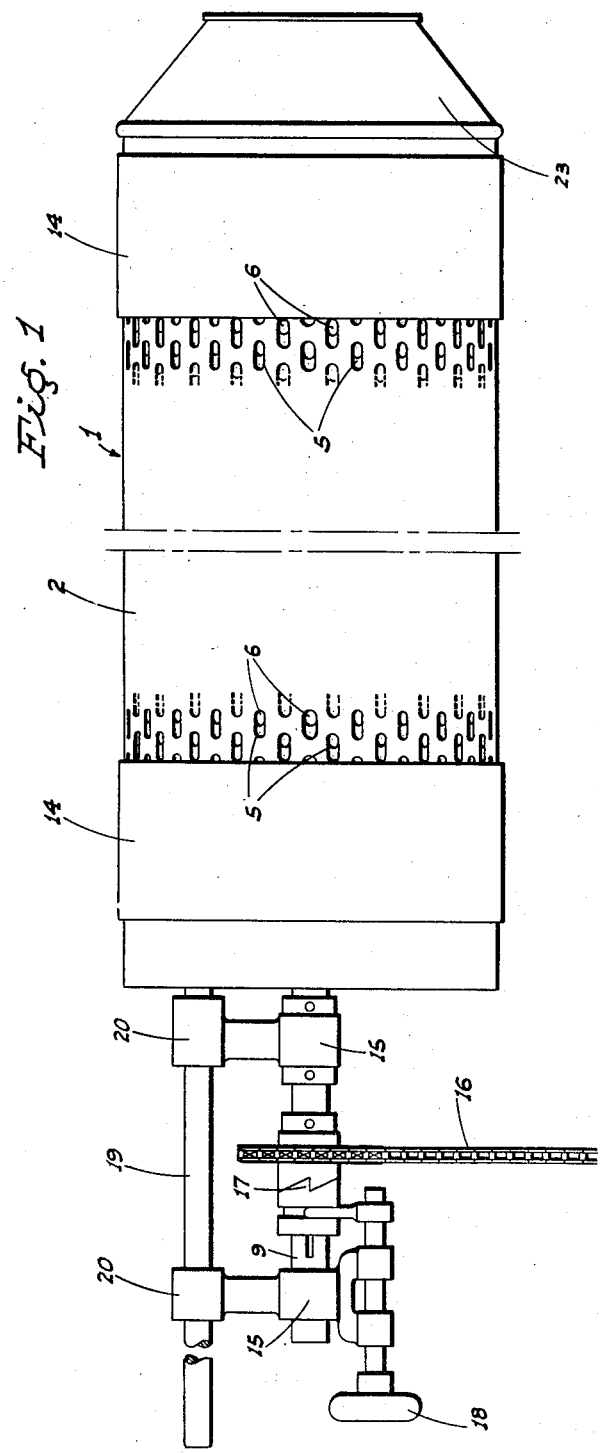
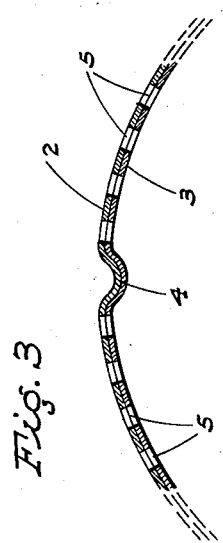
INVENTOR
Walter C. Hanson
ATTYS

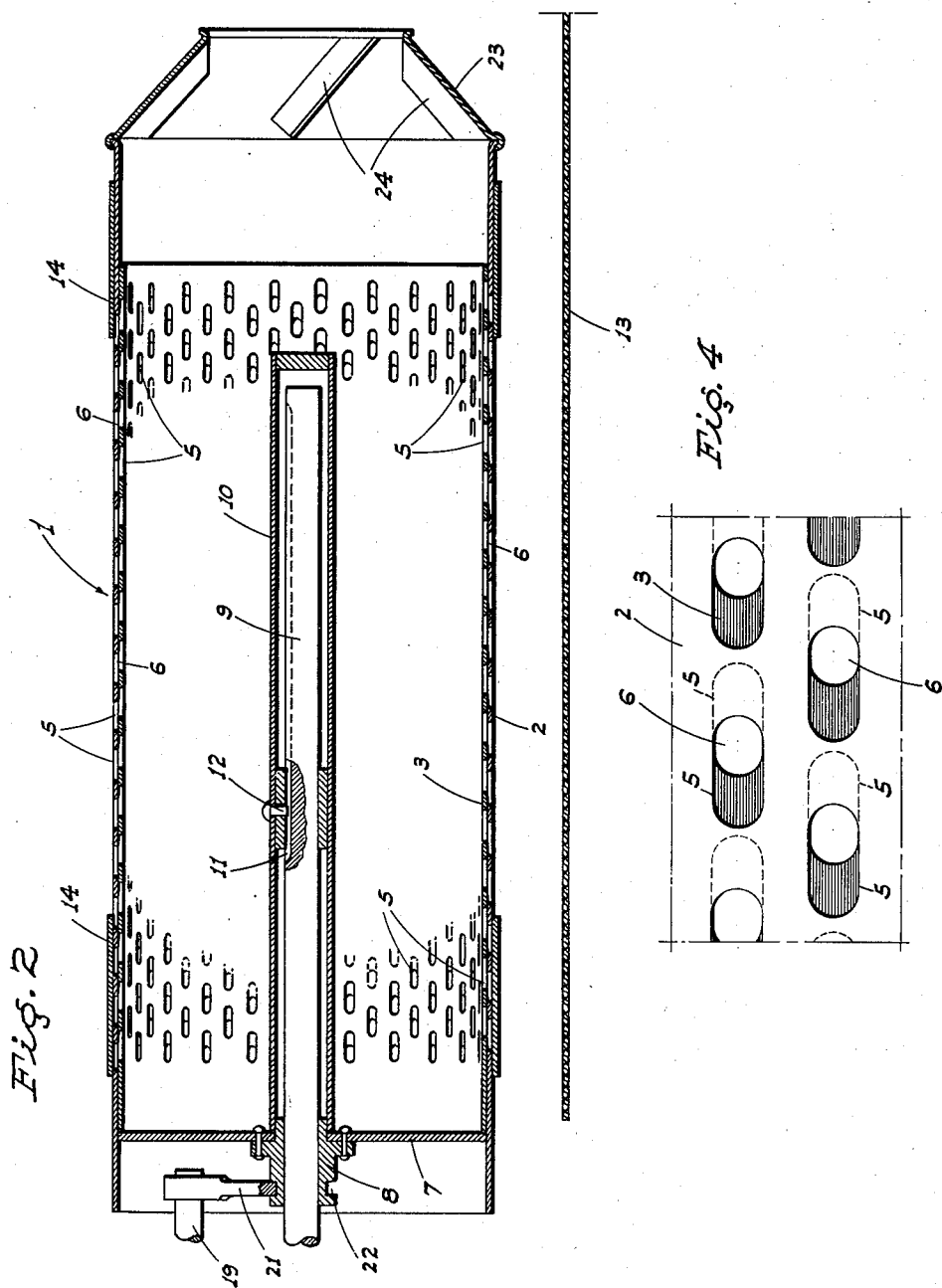

UNITED STATES PATENT OFFICE 2,520,718

MATERIAL SPREADING APPARATUS

Walter C. Hanson, Fresno, Calif., assignor of one-half to David R. McKinley, Sacramento, Calif.

Application July 12, 1946, Serial No. 683,078

2 Claims. (Cl. 107—7)

This invention relates in general to bakery equipment.

In particular the invention is directed to, and it is an object to provide, a power driven spreading apparatus for raisins, or the like; the apparatus being operative to evenly distribute raisins, in controlled quantity, on a finished layer of pastry dough passing on a conveyor beneath such apparatus.

It is also an object to provide a raisin spreading apparatus which includes a perforate drum assembly mounted for rotation, in intersecting relation, above the conveyor for the layer of dough.

Another object of the invention is to provide a raisin spreading apparatus, as above, which is adjustable so as to regulate the quantity of raisins dischrged onto any given area of the layer of dough.

A further object of the invention is to provide raisin spreading apparatus which includes adjustable masks arranged in a manner such that the spreading width of the apparatus may be set to correspond to the width of the layer of dough onto which the raisins are to be distributed.

A further object of the invention is to provide a practical material spreading apparatus, and one which will be exceedingly effective for the purpose for which it is designed.

These objects are accomplished by means of such structure and relative arrangement of parts as will fully appear by a perusal of the following specification and claims.

In the drawings

Fig. 1 is a top plan view of the apparatus.

Fig. 2 is a longitudinal sectional elevation thereof.

Fig. 3 is a fragmentary cross section of the drum assembly.

Fig. 4 is an enlarged fragmentary plan view illustrating the complementary holes in the telescopically mounted drums.

Referring now more particularly to the characters of reference on the drawings, the apparatus comprises a perforate and elongate drum assembly, indicated generally at 1, and which assembly is horizontally disposed and includes an outer drum 2, and an inner drum 3; the inner and outer drums being maintained against rotation relative to each other by means of a longitudinal deformation 4 therein.

The outer and inner drums 2 and 3 are provided with longitudinal rows of alined, complementary holes 5, which holes are elongated lengthwise of the drums. The extent of registry of the elongated holes 5 is controlled by telescopic movement of the drums 2 and 3. In this manner the port 6 provided by the registry of complementary ones of the holes 5, may be varied in size, which controls the amount of raisins delivered from the drum assembly, in the manner hereinafter described.

The complementary holes 5 are staggered, circumferentially of the drum assembly, relative to corresponding holes in adjacent rows, whereby to assure of even distribution of raisins from the perforate drum assembly 1.

At one end the inner drum 3 is fitted with a rigid end head 7 carrying a center bearing 8 through which a supporting and drive shaft 9 projects into the drum assembly. A rigid tube or sleeve 10 is fixed in connection with the bearing 8 and extends a substantial distance axially into the drum in surrounding and clearance relation to the shaft 9. Said shaft 9 is formed with a longitudinal keyway 11, and a key 12 in the sleeve runs in said keyway.

By reason of the above arrangement the drum assembly 1 is supported by, and for rotation from, the shaft 9, and additionally the drum assembly can be shifted along said shaft 9 by reason of the described keyway mechanism.

The perforate drum assembly is supported by the shaft 9 above and transversely of a conveyor 13; the conveyor being adapted to support and move a layer of finished dough beneath said drum assembly.

The shifting of the drum assembly along the shaft 9 is desirable for the purpose of establishing proper alinement between said drum assembly and a layer of dough moving on the conveyor 13. Also, such layer of dough may be of limited width, and to regulate the discharge width of the drum assembly there is provided on the latter a pair of transversely spaced, annular blocking or masking bands 14 slidably mounted on the outer drum 2. By slidably adjusting the masking bands 14 discharge or distribution of raisins from the drum assembly can be restricted to a predetermined width between said bands.

The shaft 9 is supported beyond one end of the drum assembly 1 by means of a pair of fixed bearings 15 which may be suitably frame mounted. The shaft is driven, from between the bearings 15, by an endless chain and sprocket unit 16 coupled to said shaft through the medium of a clutch 17 whose engagement is controlled by a hand unit 18.

Sliding of the drum assembly 1 along the shaft 9, for the purpose herein hereinbefore described, is accomplished through the medium of a slide or control rod 19 shiftably supported in guide blocks 20 mounted in connection with the fixed bearings 15. At its inner end the slide rod 19 is formed with a fork 21 which cooperates with an annular groove 22 in the bearing 8. Thus, upon axial sliding movement of the rod 19, the bearing 8, and consequently the entire drum assembly 1, is shiftable along the shaft 9 to a selected position of adjustment.

At the end opposite the supporting and drive arrangement for the drum assembly 1, the latter is provided with an open ended feed cone 23 including internal deflectors 24.

Raisins as fed into the cone 23 are engaged by the deflectors 24 and delivered directly into the drum assembly. With rotation of such drum assembly the raisins are agitated and separated, the individual raisins then passing downwardly through the ports 6 at the bottom of said drum assembly, whence said raisins fall—in even distribution—onto the layer of dough passing on the conveyor 13 in a direction intersecting the axis of the drum assembly.

The herein described invention provides effective and practical apparatus for the even and constant distribution of raisins or the like onto pastry dough, and the described adjustments of the apparatus are such that not only can the quantity of raisins distributed to any given area of dough be controlled, but the distribution width and distribution point can be set as desired.

While the apparatus which is the subject of this invention is especially designed for spreading raisins in bakery operations, such apparatus may, of course, be put to many other uses to which it may be well suited.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. Material spreading apparatus comprising a substantially horizontal drum assembly, said assembly being perforate and adapted to receive material therein for spreading, an end head in the drum assembly at one end, a center bearing in the end head, a rotatably supported shaft projecting into the drum assembly through the bearing, an elongated axial sleeve in the drum assembly about the shaft and fixed in connection with the end head, the shaft having a longitudinal key-way therein within the sleeve, a key mounted in the sleeve and relatively slidably engaging in the key-way, and means to rotate the shaft.

2. Material spreading apparatus comprising a substantially horizontal drum assembly, said assembly being perforate and adapted to receive material therein for spreading, an end head in the drum assembly at one end, a center bearing in the end head, a rotatably supported shaft projecting into the drum assembly through the bearing, an elongated axial sleeve in the drum assembly about the shaft and fixed in connection with the end head, the shaft having a longitudinal key-way therein within the sleeve, a key mounted in the sleeve and relatively slidably engaging in the key-way, and means to rotate the shaft; there being a drum assembly shifting rod slidably mounted parallel to the shaft, and connection means between the rod and drum assembly operative without limiting rotation of the latter.

WALTER C. HANSON.

REFERENCES CITED

The following references are of record in the file of this patent:

UNITED STATES PATENTS

| Number | Name | Date |
| --- | --- | --- |
| 272,278 | Lipps | Feb. 13, 1883 |
| 307,508 | Ullathorne | Nov. 4, 1884 |
| 330,342 | Monroe et al. | Nov. 10, 1885 |
| 345,186 | Stauffer | July 6, 1886 |
| 908,618 | Skagen | Jan. 5, 1909 |
| 1,285,280 | McCarty | Nov. 19, 1918 |
| 2,390,195 | Tascher | Dec. 4, 1945 |

FOREIGN PATENTS

| Number | Country | Date |
| --- | --- | --- |
| 177,420 | Germany | Dec. 2, 1904 |